United States Patent
Yoo et al.

(10) Patent No.: US 7,091,054 B2
(45) Date of Patent: Aug. 15, 2006

(54) MANUFACTURING METHOD FOR EMITTER FOR ELECTRON-BEAM PROJECTION LITHOGRAPHY

(75) Inventors: In-kyeong Yoo, Kyungki-do (KR); Chang-wook Moon, Kyungki-do (KR); Soo-hwan Jeong, Kyungki-do (KR); Dong-wook Kim, Seoul (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 0 days.

(21) Appl. No.: 11/057,469

(22) Filed: Feb. 15, 2005

(65) Prior Publication Data

US 2005/0145835 A1    Jul. 7, 2005

Related U.S. Application Data

(62) Division of application No. 10/674,459, filed on Oct. 1, 2003, now Pat. No. 6,953,946.

(30) Foreign Application Priority Data

Mar. 15, 2003    (KR) .................... 10-2003-0016288

(51) Int. Cl.
*H01L 21/00* (2006.01)
(52) U.S. Cl. ................ 438/20; 438/20; 438/22; 438/48
(58) Field of Classification Search ................ 438/20, 438/22, 48; 257/10
See application file for complete search history.

(56) References Cited

U.S. PATENT DOCUMENTS 5,430,292 A * 7/1995 Honjo et al. ............... 250/310

| | | | |
|---|---|---|---|
| 2001/0017369 A1 | 8/2001 | Iwasaki et al. | |
| 2002/0167001 A1 | 11/2002 | Chen et al. | |
| 2003/0089900 A1 | 5/2003 | Chen et al. | |
| 2004/0031955 A1 | 2/2004 | Sheng et al. | |

OTHER PUBLICATIONS

Yokoo et al., "Energy distribution of tunneling emission from Si-gate metal-oxide-semiconductor cathrode", J. Vac. Sci. Technol. B, vol. 12, No. 2, pp. 801-805, 1994.

* cited by examiner

*Primary Examiner*—David Nelms
*Assistant Examiner*—Thinh T Nguyen

(57) ABSTRACT

An emitter for an electron-beam projection lithography (EPL) system and a manufacturing method therefor are provided. The electron-beam emitter includes a substrate, an insulating layer overlying the substrate, and a gate electrode including a base layer formed on top of the insulating layer to a uniform thickness and an electron-beam blocking layer formed on the base layer in a predetermined pattern. The manufacturing method includes steps of: preparing a substrate; forming an insulating layer on the substrate; forming a base layer of a gate electrode by depositing a conductive metal on the insulating layer to a predetermined thickness; forming an electron-beam blocking layer of the gate electrode by depositing a metal capable of anodizing on the base layer to a predetermined thickness; and patterning the electron-beam blocking layer in a predetermined pattern by anodizing. The emitter provides a uniform electric field within the insulating layer and simplify the manufacturing method therefor.

15 Claims, 9 Drawing Sheets

MANUFACTURING METHOD FOR EMITTER FOR ELECTRON-BEAM PROJECTION LITHOGRAPHY

This Application is a Division of Ser. No. 10/674,459 Oct. 1, 2003 now U.S. Pat. No. 6,953,946.

This application claims the priority of Korean Patent Application No. 2003-16288, filed on Mar. 15, 2003, in the Korean Intellectual Property Office, the content of which is incorporated herein by reference in its entirety.

BACKGROUND OF THE INVENTION

1. Field of the Invention

The present invention relates to an electron-beam lithography projection system, and more particularly, to an electron-beam emitter capable of securing a uniform electric field within an insulating layer of the emitter and simplifying a manufacturing method therefor.

2. Description of the Related Art

During a semiconductor manufacturing process, various lithographic techniques are employed to form a desired pattern on the surface of a substrate. Conventional optical lithography using light such as ultraviolet rays has a limit regarding a line width that can be implemented with this technique. For this reason, next generation lithography (NGL) techniques have been recently proposed, by which more miniaturized and integrated semiconductor ICs with nano-scale line widths can be realized. Examples of the NGL techniques include electron-beam projection lithography (EPL), ion projection lithography (IPL), extreme ultraviolet lithography (EUVL), and proximity X-ray lithography.

Among the NGL systems, EPL systems for patterning an electron-resist coated on a substrate to be processed into a desired form by using electron-beams emitted from an emitter are currently widely used since they have a simplified structure and it is easy to implement a large-area electron-beam emitter. Electron beam emitters with various structures can be adopted for this EPL system, and two examples of these structures are shown in FIGS. 1 and 2.

Referring to FIG. 1, a conventional metal-insulator-semiconductor (MIS) type emitter 10 has a structure in which an insulating layer 12 and a gate electrode 13 are sequentially stacked on a silicon substrate 11. The insulating layer 12 is formed from a silicon oxide layer, and the gate electrode 13 is made of conductive metal such as gold (Au).

As shown in FIG. 2, a metal-insulator-metal (MIM) type emitter 20 has a structure in which a lower electrode 22, an insulating layer 23, and a gate electrode 24 are sequentially stacked on a silicon substrate 21. Typically, the lower electrode 22 is made of aluminum (Al)—neodymium (Nd) alloy, the insulating layer 23 is made of anodized alumina, and the gate electrode 24 is made of a conductive metal such as gold (Au).

The insulating layers 12 and 23 of the conventional MIS and MIM type emitters 10 and 20, respectively, are patterned into a predetermined form and comprise thin and thick portions. In the emitters constructed above, electrons are emitted through the thin portions of the insulating layers 12 and 23.

FIGS. 3A–3D are cross-sections for explaining a method of manufacturing the conventional MIS type emitter 10 shown in FIG. 1. Referring to FIG. 3A, the surface of the silicon substrate 11 is thermally oxidized to form a silicon oxide layer 12a to a predetermined thickness. Then, as shown in FIG. 3B, the silicon oxide layer 12a are patterned into a desired form, and a silicon oxide layer 12b is formed as shown in FIG. 3C. As a result, the insulating layer 12 is lapped over the silicon substrate 11 in a predetermined pattern. Finally, as shown in FIG. 3D, a conductive metal such as gold (Au) is deposited over the entire surface of the insulating layer 12 to a predetermined thickness to form the gate electrode 13. After undergoing the above steps, the MIS type emitter 10 configured as above is completed.

The conventional MIM type emitter 20 of FIG. 2 is manufactured in a similar way. The process of manufacturing the conventional emitter 10 or 20 involves forming the insulating layer 12 or 23 by performing two steps of forming an oxide layer and one step of patterning the oxide layer and forming the gate electrodes 13 or 24 on the stepped insulating layer 12 or 23. This process is very complicated and in addition the conventional emitter 10 or 20 does not secure a uniform electric field within the insulating layer 12 or 23 due to the stepped structure.

SUMMARY OF THE INVENTION

The present invention provides an electron-beam emitter capable of securing a uniform electric field within an insulating layer of the emitter and simplifying the manufacturing process and manufacturing method thereof.

According to an aspect of the present invention, there is provided an emitter for an electron-beam projection lithography (EPL) system including: a substrate; an insulating layer overlying the substrate; and a gate electrode comprised of a base layer, formed on the insulating layer to a uniform thickness, and an electron-beam blocking layer formed on the base layer in a predetermined pattern. Here, the insulating layer is made of a silicon oxide layer.

The emitter according to this invention may further include a lower electrode between the substrate and the insulating layer, and the insulating layer is made from an anodized metal.

While the base layer is made of a conductive metal such as gold (Au), platinum (Pt), aluminum (Al), titanium (Ti), or tantalum (Ta), the electron-beam blocking layer is made of a metal capable of anodizing such as titanium (Ti), aluminum (Al), or ruthenium (Ru). The base layer and the electron-beam blocking layer of the gate electrode may also be made of silicon.

According to another aspect of the present invention, there is provided a method of manufacturing an emitter for an electron-beam projection lithography (EPL) system. The method includes steps of: (a) preparing a substrate; (b) forming an insulating layer on the substrate; (c) forming a base layer of a gate electrode by depositing a conductive metal on the insulating layer to a predetermined thickness; (d) forming an electron-beam blocking layer of the gate electrode by depositing a metal capable of anodizing on the base layer to a predetermined thickness; and (e) patterning the electron-beam blocking layer in a predetermined pattern by anodizing.

Here, the substrate is a silicon wafer, and the insulating layer is made of a silicon oxide layer formed by thermally oxidizing the surface of the silicon wafer.

Before step (b), the method may further including a step of forming a lower electrode on the substrate. In this case, the insulating layer is formed by depositing a metal capable of anodizing on the lower electrode and anodizing the metal.

Step (e) includes steps of: anodizing the electron-beam blocking layer in a predetermined pattern by scanning probe microscope (SPM) lithography; and removing the anodized portion of the electron-beam blocking layer by etching.

Step (e) may also include steps of: coating a resist on the surface of the electron-beam blocking layer; patterning the resist in a predetermined pattern; anodizing a portion of the electron-beam blocking layer exposed by patterning of the resist; and removing the anodized portion of the electron-beam blocking layer by etching and cleaning off the resist.

Alternatively, the method of manufacturing an emitter for an EPL system may include steps of: (a) preparing a substrate; (b) forming an insulating layer on the substrate; (c) depositing a first silicon layer on the insulating layer to a uniform thickness; (d) patterning the first silicon layer in a predetermined pattern; and (e) depositing a second silicon layer on the insulating layer exposed in step (d) and first silicon layer and forming a gate electrode comprised of the first and second silicon layers.

Here, step (d) includes steps of: coating a resist on the surface of the first silicon layer; patterning the resist in a predetermined pattern; and etching the first silicon layer using the resist as an etch mask.

BRIEF DESCRIPTION OF THE DRAWINGS

The above objects and advantages of the present invention will become more apparent by describing in detail preferred embodiments thereof with reference to the attached drawings in which.

DETAILED DESCRIPTION OF THE INVENTION

Figure 1:
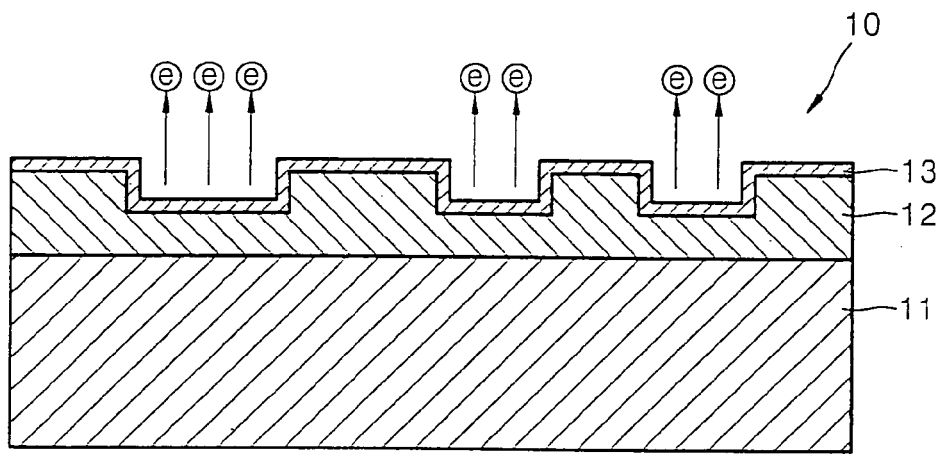
FIG. 1 is a cross-section showing the structure of a conventional metal-insulator-semiconductor (MIS) type emitter adopted for an electron-beam projection lithography (EPL) system.
Figure 2:
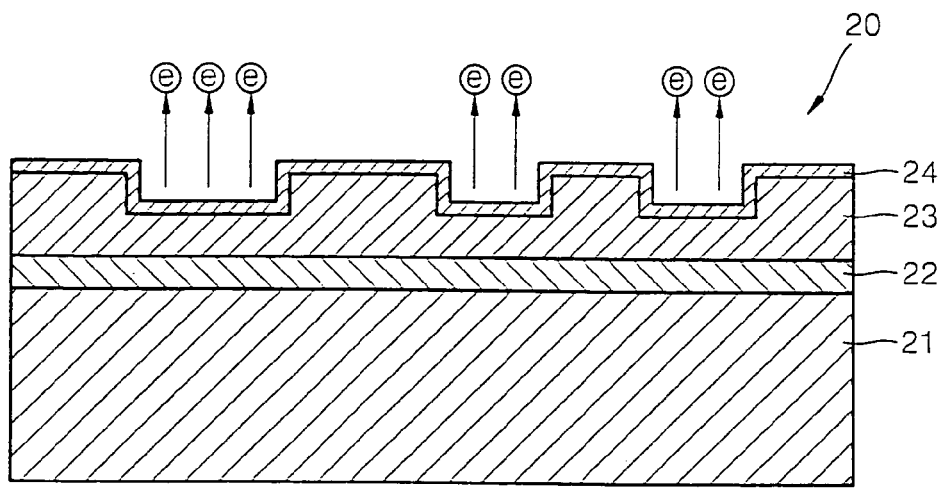
FIG. 2 is a cross-section showing the structure of a conventional metal-insulator-metal (MIM) type emitter adopted for an EPL system.
Figure 3A:
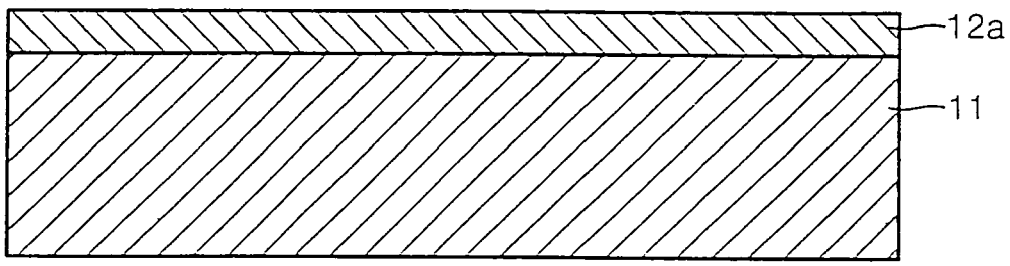
FIGS. 3A–3D are cross-sections showing steps in a method of manufacturing the conventional MIS type emitter of FIG. 1.
Figure 3B:
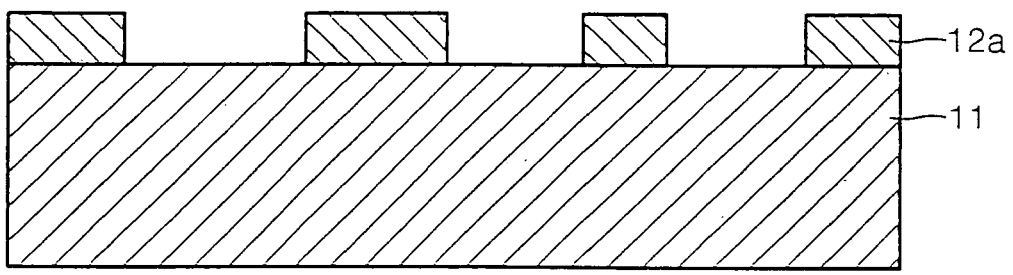
Figure 3C:
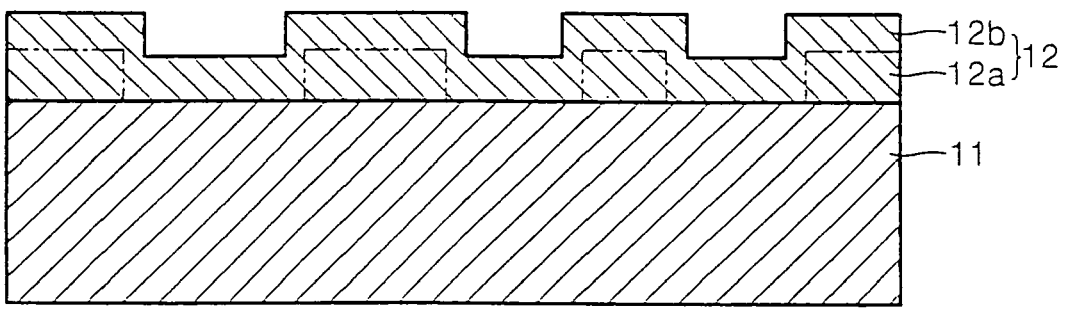
Figure 3D:
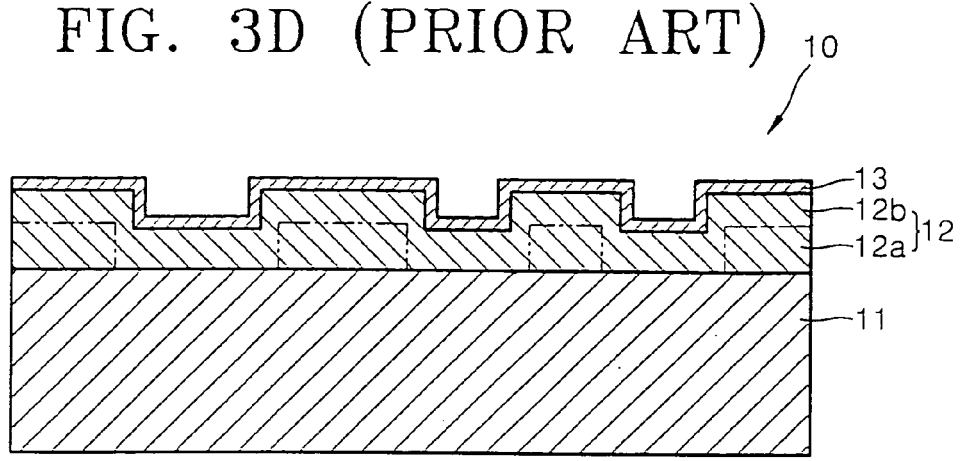
Figure 4:
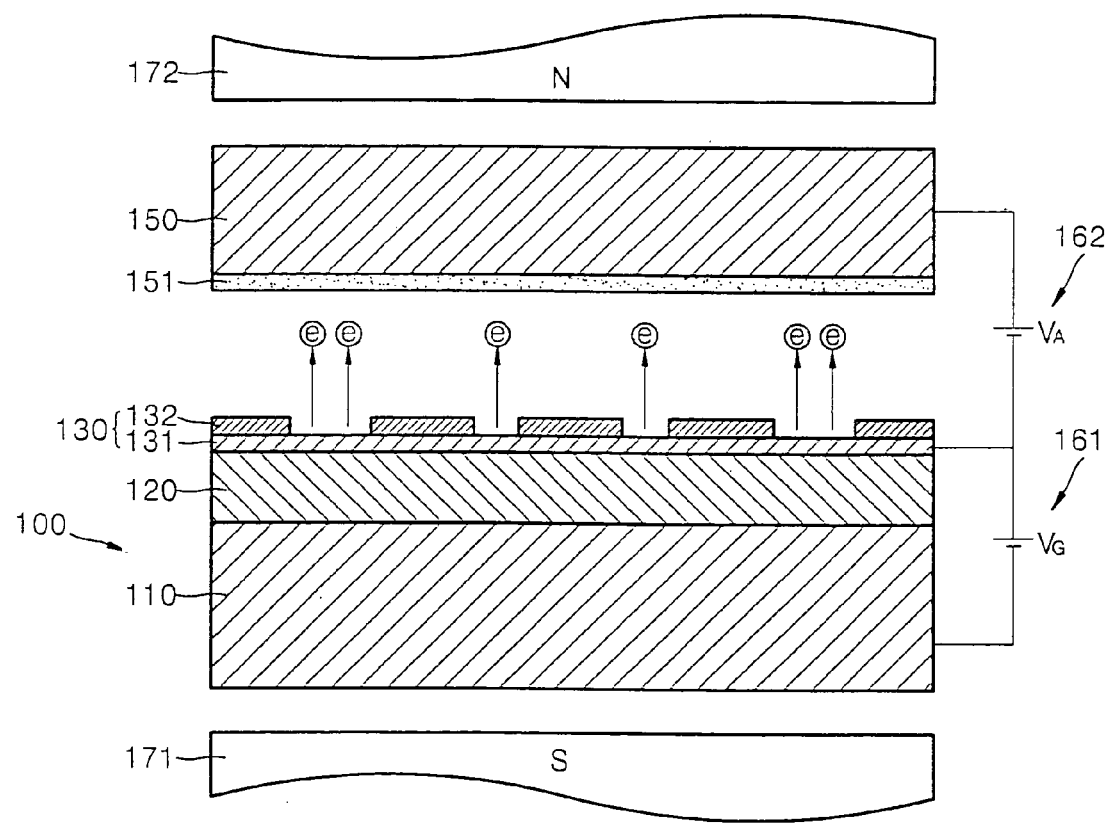
FIG. 4 schematically shows an EPL system adopting an MIS type emitter according to a first embodiment of the present invention.

Referring to FIG. 4, an electron-beam projection lithography (EPL) system includes a metal-insulator-semiconductor (MIS) type emitter 100 that emits electron beams toward an electron-resist 151 applied on a substrate 150 to be processed, power supplies 161 and 162 that create an electric field between the emitter 100 and the substrate 150 to be processed, and magnets 171 and 172 disposed outside of the emitter 100 and the substrate 150 to be processed for creating a magnetic field between the emitter 100 and the substrate 150 to be processed. For the magnets 171 and 172, a permanent magnet or electromagnet can be used.

The MIS type emitter 100 includes a substrate 110, an insulating layer 120 overlying the substrate 120, and a gate electrode 130 overlying the insulating layer 120. The gate electrode 130 includes a base layer 131 conformably overlying the insulating layer 120 and an electron-beam blocking layer 132 formed on the base layer 131 in a predetermined pattern.

For the substrate 110, a silicon substrate can be used. The insulating layer 120 may include a silicon oxide formed by thermally oxidizing the silicon substrate 110. Unlike the conventional art, the insulating layer 120 is formed to a constant thickness so that an electric field created within the insulating layer 120 is uniform.

While the base layer 131 of the gate electrode 130 may be made of conductive metal such as gold (Au), platinum (Pt), aluminum (Al), titanium (Ti), or tantalum (Ta), the electron-beam blocking layer 132 is made of metal capable of anodizing such as titanium (Ti), aluminum (Al), or ruthenium (Ru). The base layer 131 and the electron-beam blocking layer 132 can be made of silicon.

In the emitter 100, the base layer 131 is formed to a uniform thickness, and the electron-beam blocking layer 132 has a predetermined pattern. Thus, the base layer 131 has portions covered and uncovered by the electron-beam blocking layer 132. That is, the gate electrode 130 including the base layer 131 of a uniform thickness and the electron-beam blocking layer 132 patterned in a predetermined pattern has a different thickness.

Electron emission characteristics of the emitter 100 typically sensitively vary with material characteristics and thickness of the gate electrode 130. In particular, as the gate electrode 130 becomes thicker, the amount of electrons emitted through the gate electrode 130 decreases significantly. The relationship between the thickness of the gate electrode 13 and electron transfer ratio is shown in a graph of FIG. 5. The graph is disclosed in a paper by Kuniyoshi Yokoo, et al. (J. Vac. Sci. Technol. B, Vol, 12, No. 2, March/April 1994).

Figure 5:
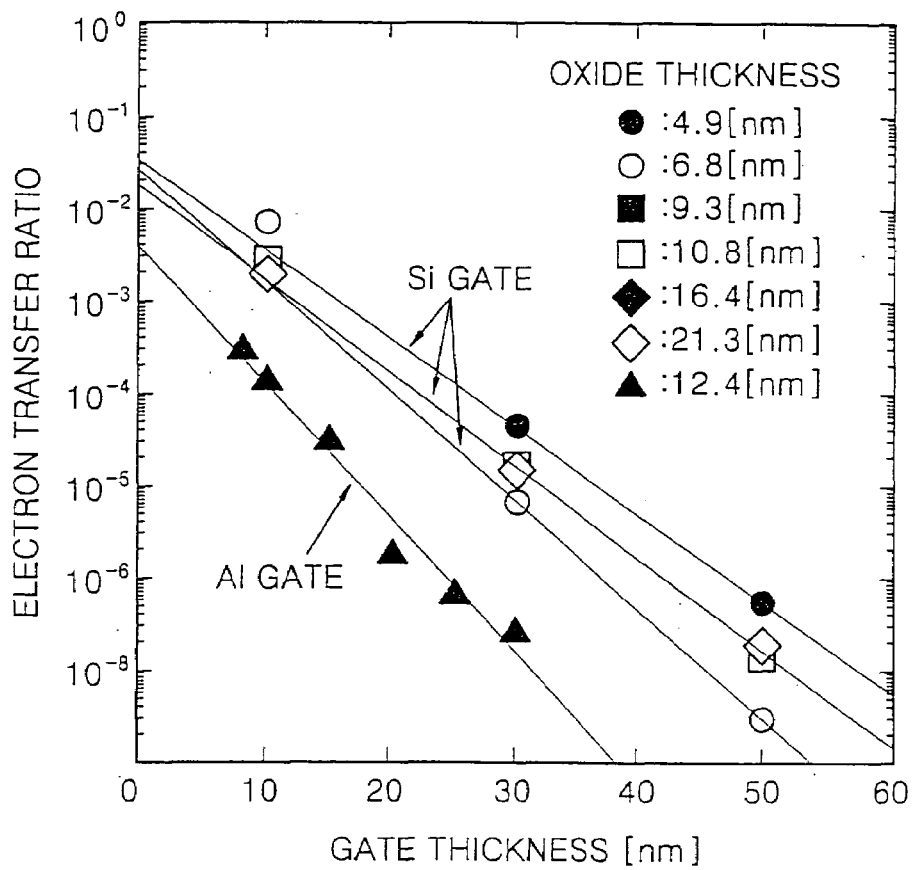
FIG. 5 is a graph showing the relationship between the thickness of the gate electrode and electron transfer ratio.

It is evident from the graph of FIG. 5 that as the thickness of gate electrode increases, electron transfer ratio decreases greatly. For example, if the thickness of the gate electrode made of aluminum doubles from 10 to 20 nm, the electron transfer ratio decreases from $10^{-4}$ to $10^{-6}$ by a factor of 100. The same characteristic is exhibited in a gate electrode made of silicon (Si).

Returning to FIG. 4, in the emitter 100, when a gate voltage $V_G$ is applied between the silicon substrate 110 and the gate electrode 130, the electron beams are emitted from the emitter 100 by penetrating through the portion of the gate electrode 130 uncovered by the electron-beam blocking layer 132, that is, its thin portion, according to the electron emission characteristics with respect to the thickness of the gate electrode 130. However, the electron beams can be scarcely emitted through the thick portion of the gate electrode 130, i.e., a portion covered by the electron-beam blocking layer 132. The electron beams emitted from the emitter 100 are accelerated due to an acceleration voltage $V_A$ applied between the gate electrode 130 and the substrate 150 to be processed and directed to collide with the electron resist 150 coated on the surface of the substrate 150 to be processed. The electron-resist 151 is then patterned in the same form as the electron-beam blocking layer 132. In this case, a magnetic field can be created between the emitter 100 and the substrate 150 to be processed by the external magnets 171 and 172 for focusing of the electron beams.

Figure 6:
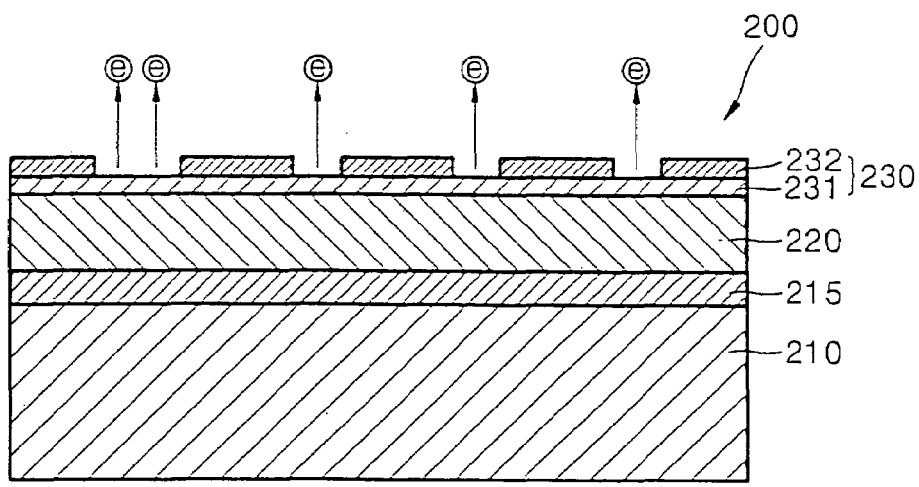
FIG. 6 is a cross-section showing the structure of an MIM type emitter according to a second embodiment of the present invention.

FIG. 6 is a cross-section showing the structure of an MIM type emitter according to a second embodiment of this invention. Referring to FIG. 6, an MIM type emitter 200 according to this invention consists of a lower electrode 215 overlying a substrate 210, an insulating layer 220 overlying the lower electrode 215, and a gate electrode 230 overlying the insulating layer 220. The gate electrode 230 includes a base layer 231 overlying the insulating layer 220 and an electron-beam blocking layer 232 formed on the base layer 231 in a predetermined pattern. In this way, the MIM type emitter 200 has the same structure as the MIS type emitter 100 except for the presence of the lower electrode 215 between the substrate 210 and the insulating layer 220. Thus, the MIM type emitter 200 will now be described with respect to this difference.

For the substrate 210, a silicon substrate can be used. The lower electrode 215 is formed from aluminum (Al)-neodymium (Nd) alloy, and the insulating layer 220 is made of anodized alumina having a uniform thickness.

The gate electrode 230 including the base layer 231 and the electron-beam blocking layer 232 as shown in the MIS type emitter 100 is identical with the gate electrode 130 in terms of materials and structures of both layers. Since the operation and effects of the MIM type emitter 200 is the same as the MIS type emitter 100, a detailed description will be omitted.

In a method of manufacturing the MIS type emitter shown in FIG. 4 will now be described with references to FIGS. 7A–7H.

Figure 7A:
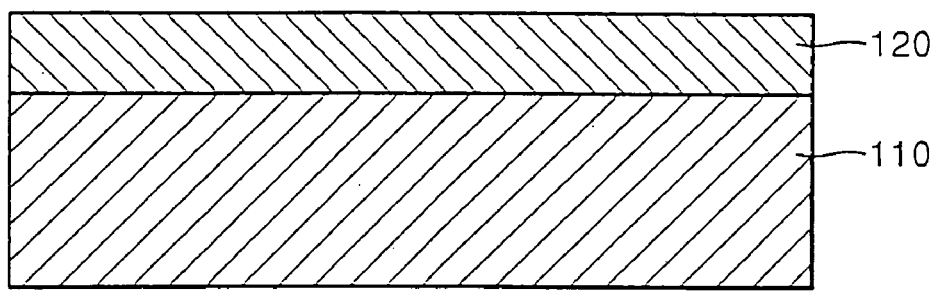
FIGS. 7A–7H are cross-sections showing steps in a method of manufacturing the MIS type emitter of this invention shown in FIG. 4 according to a first embodiment of the present invention.

First, referring to FIG. 7A, the substrate 110 is prepared, and the insulating layer 120 is formed on the substrate 110. Specifically, a silicon wafer may be used as the substrate 110. The surface of the prepared substrate 110 is thermally oxidized to form a silicon oxide layer of a uniform thickness thereon. The silicon oxide layer serves as the insulating layer 120.

Figure 7B:
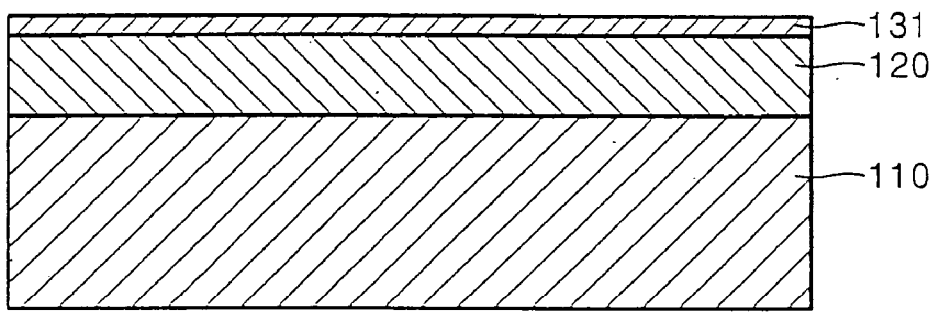

FIG. 7B shows the state in which the base layer 131 has been formed on the insulating layer 120. Specifically, to form the base layer 131, a conductive metal such as gold (Au), platinum (Pt), aluminum (Al), titanium (Ti), or tantalum (Ta) is deposited on the insulating layer 120 to a predetermined thickness by means of vacuum evaporation or sputtering.

Figure 7C:
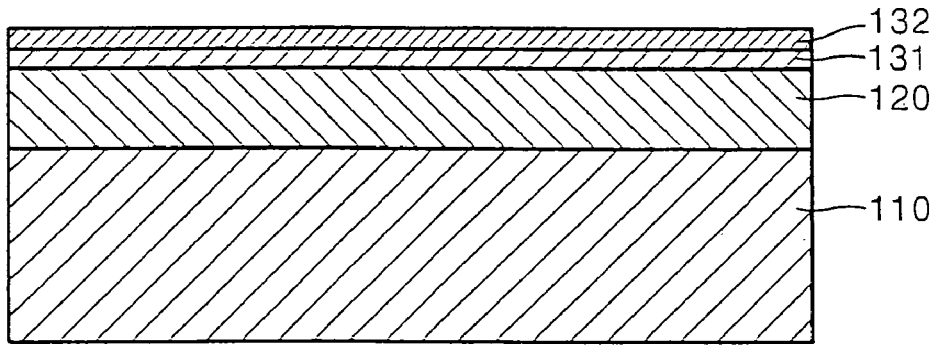

FIG. 7C shows the state in which the base layer 131 has been covered by the electron-beam blocking layer 132. Specifically, the electron-beam blocking layer 132 may be formed by depositing a metal capable of anodizing, such as titanium (Ti), aluminum (Al), or ruthenium (Ru), on the base layer 131 to a predetermined thickness by vacuum evaporation or sputtering.

Figure 7D:
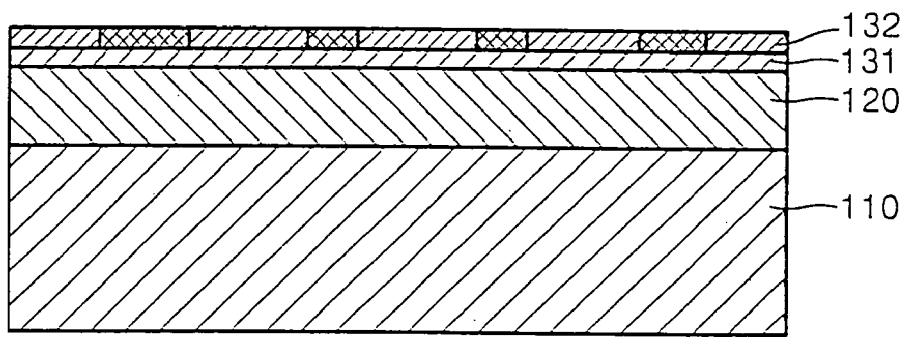
Figure 7E:
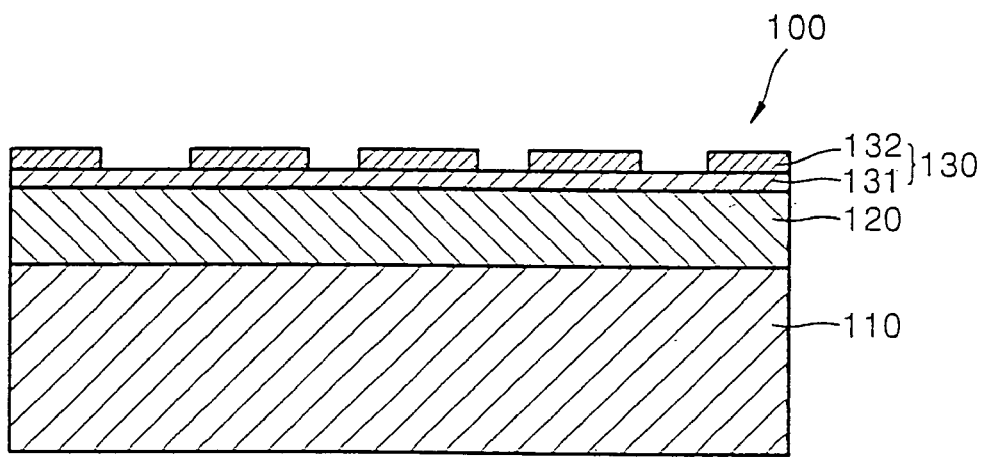

FIGS. 7D and 7E show a first method of patterning the electron-beam blocking layer 132 in a desired form. As shown in FIG. 7D, only a portion electron-beam blocking layer 132 through which the electron beams are to be emitted is anodized by scanning probe microscope (SPM) lithography. Then, as shown in FIG. 7E, the anodized portion of the electron-beam blocking layer 132 is removed by etching. In this case, since the oxide layer formed by anodizing has a high etching selectivity with respect to the unanodized portion of the electron-beam blocking layer 132, only the oxide layer formed by anodizing can be easily removed by etching.

After having undergone the above steps, the MIS type emitter 100 having the gate electrode 130 including the base layer 131 with a uniform thickness and the patterned electron-beam blocking layer 132 is completed as shown in FIG. 7E.

Figure 7F:
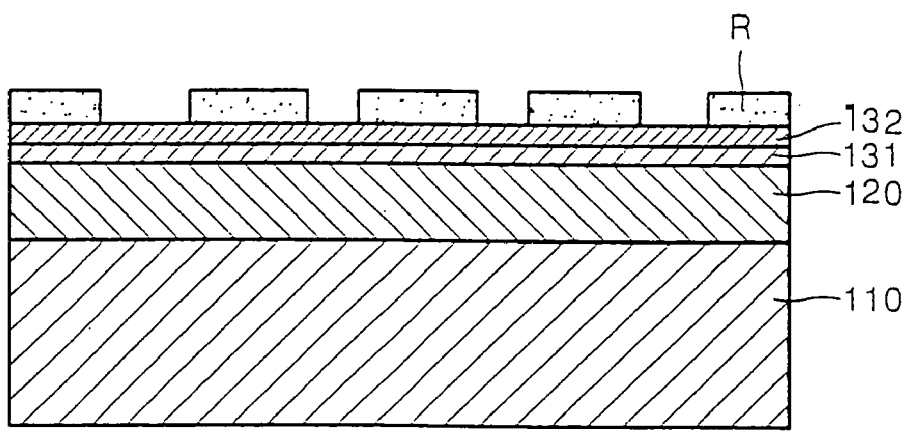
Figure 7G:
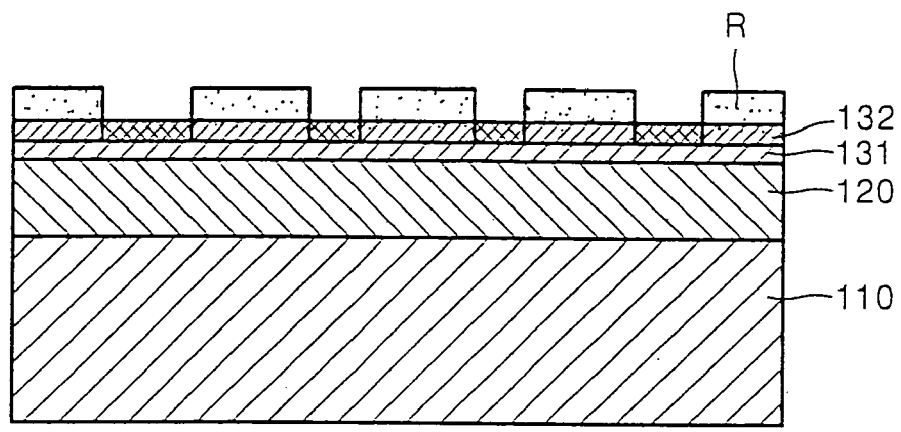
Figure 7H:
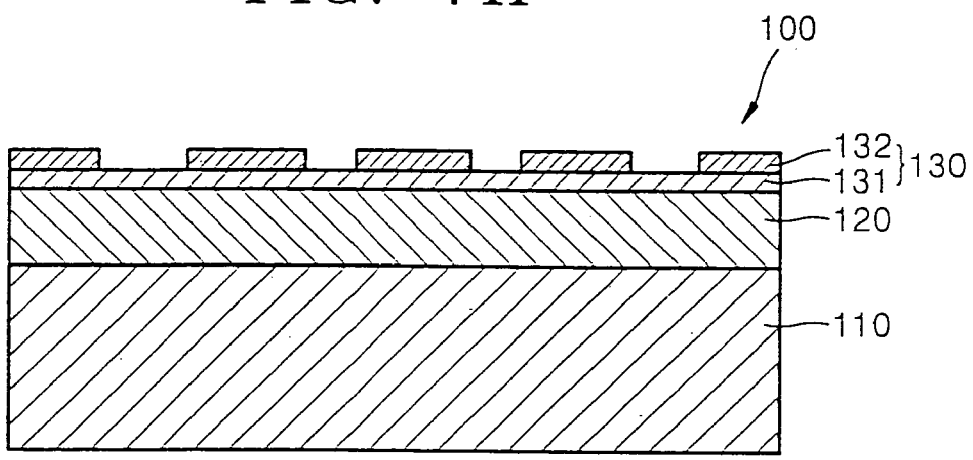

Meanwhile, FIGS. 7F–7H show a second method of patterning the electron-beam blocking layer 132 in a desired shape. First, referring to FIG. 7F, a resist R is applied on the entire surface of the electron-beam blocking layer 132 formed in step shown in FIG. 7C and then patterned in a desired pattern. In this case, resist patterning can be performed by photolithography or typical lithography such as EPL. This is followed by anodizing of the electron-beam blocking layer 132 as shown in FIG. 7G. At this time, the exposed portion of the electron-beam blocking layer 132 is anodized instead of the portion covered by the patterned resist R. The anodized portion of the electron-beam blocking layer 132 is then removed by etching, and the remaining resist R is cleaned off. At this time, the cleaning of the resist R may be performed before or after the etching process. After the above steps, the MIS type emitter 100 is completed as shown in FIG. 7H.

FIGS. 8A–8D are cross-sections for explaining a method of manufacturing the MIS type emitter 100 shown in FIG. 4 according to a second embodiment of this invention. This embodiment refers to the case where the gate electrode is made of silicon.

Figure 8A:
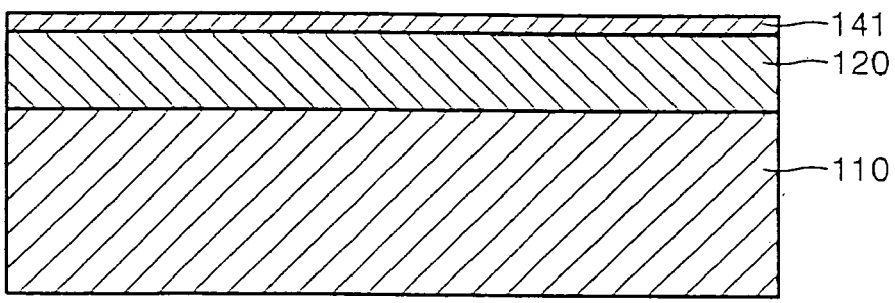
FIGS. 8A–8D are cross-sections showing steps in a method of manufacturing the MIS type emitter of this invention shown in FIG. 4 according to a second embodiment of the present invention.

Referring to FIG. 8A, the substrate 110 is prepared and the insulating layer 120 is formed on the substrate 110. As shown in the previous embodiment, a silicon wafer processed with a predetermined thickness may be used as the substrate 110, and the insulating layer 120 is made of silicon oxide. A first silicon layer 141 is then formed on the insulating layer 120 by depositing silicon by chemical vapor deposition (CVD) to a predetermined thickness.

Figure 8B:
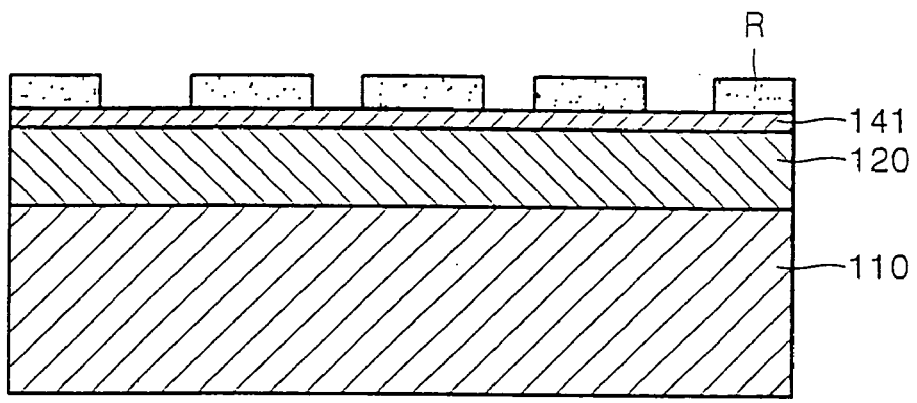
Figure 8C:
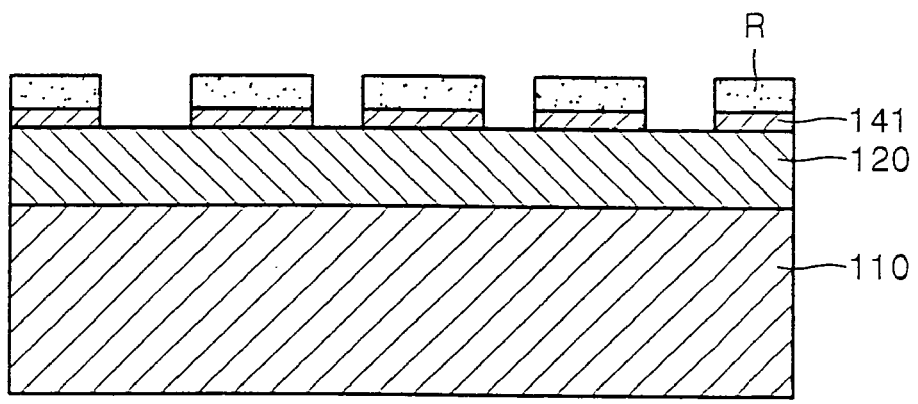

Then, as shown in FIG. 8B, a resist R is coated on the entire surface of the first silicon layer 141 and patterned in a desired pattern. In this case, resist patterning can be performed by photolithography or typical lithography such as EPL. Subsequently, as shown in FIG. 8C, the exposed portion of the first silicon layer 141 is removed by etching using the patterned resist R as an etch mask, and the remaining resist R is cleaned.

Figure 8D:
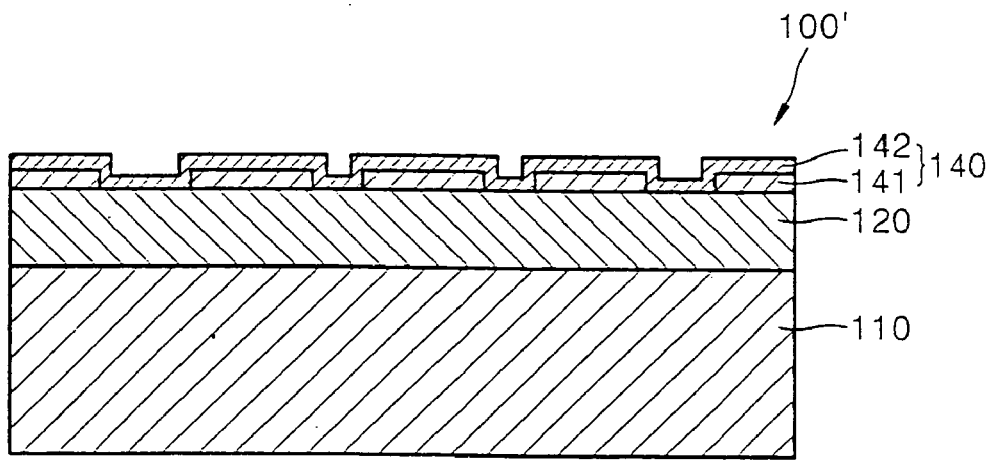

FIG. 8D shows the state in which the patterned first silicon layer 141 has been overlain by a second silicon layer 142. Specifically, the second silicon layer 142 is formed by depositing silicon on the entire surface of the resulting structure shown in FIG. 8C to a predetermined thickness by CVD, thereby forming a gate electrode 140 including the patterned first silicon layer 141 and the second silicon layer 142 deposited on the first silicon layer 141. Thus, the gate electrode 140 is has a different thickness for each of the patterned portions.

When compared with the structure of the emitter 100 shown in FIG. 4, an emitter 100' having the gate electrode 140 is constructed to include the portion of the second silicon layer 142 deposited directly on the insulating layer 120 and the first silicon layer 141, both of which correspond to the base layer 131 of the emitter 100 shown in FIG. 4, and the portion of the second silicon layer 142 deposited over the first silicon layer 141 which corresponds to the electron-beam blocking layer 132 of the emitter 100.

Figure 9A:
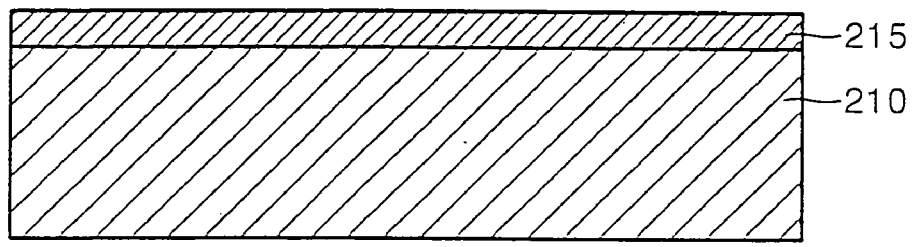
FIGS. 9A–9C are cross-sections showing steps in a method of manufacturing the MIM type emitter of this invention shown in FIG. 6, according to a preferred embodiment of the present invention.
Figure 9B:
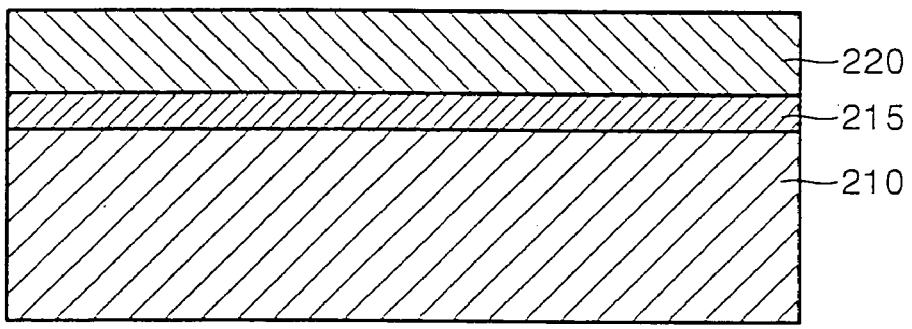
Figure 9C:
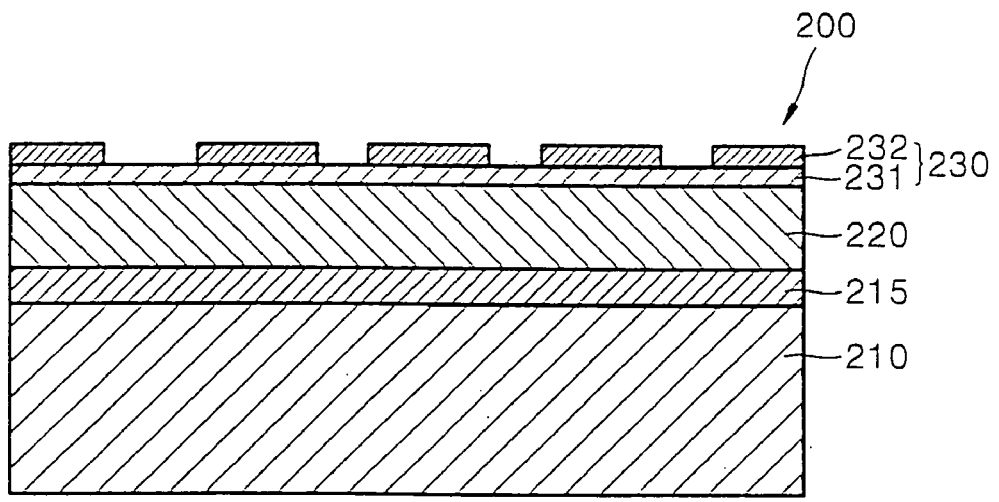

FIGS. 9A–9C are cross-sections for explaining steps in a method of manufacturing the MIM type emitter 200 of FIG. 6 according to a preferred embodiment of this invention. The same steps in the manufacturing method of this embodiment as in the previous embodiments will be described briefly or omitted.

Referring to FIG. 9A, the substrate 210 is prepared, and the lower electrode 215 is formed on the substrate 210. Specifically, a silicon wafer processed with a predetermined thickness may be used as the substrate 210. The lower electrode 215 is then formed by depositing aluminum (Al)-neodymium (Nd) alloy on the surface of the prepared substrate 210 to a predetermined thickness. Subsequently, as shown in FIG. 9B, a metal capable of anodizing, such as aluminum (Al), is deposited on the lower electrode 215 and anodized to form an oxide layer such as alumina. The alumina serves as the insulating layer 220.

Then, as shown in FIG. 9C, the gate electrode 230 including the base layer 231 and the electron-beam blocking layer 232 is formed on the insulating layer 220, thereby completing the MIM type emitter 200. In this case, the gate electrode 230 may be formed by the same process as the previous one. That is, where the base layer 231 and the electron-beam blocking layer 232 of the gate electrode 230 are made of a conductive metal and a metal capable of anodizing, respectively, the same process as the process comprised of steps shown in FIGS. 7B–7E or steps shown in FIGS. 7B, 7C, and 7F–7H may be performed to form the gate electrode 230.

Meanwhile, if the gate electrode 230 is made of silicon, it may be formed using the same process as shown in FIGS. 8A–8D.

As described above, an emitter according to this invention has an insulating layer of a uniform thickness and a patterned gate electrode. This provides a uniform electric field within the insulating layer of the emitter and simplifies the manufacturing method of the emitter, as compared with a conventional method.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. A method of manufacturing an emitter for an electron-beam projection lithography (EPL) system, the method comprising steps of:
   (a) preparing a substrate;
   (b) forming an insulating layer on the substrate;
   (c) forming a base layer of a gate electrode by depositing a conductive metal on the insulating layer to a predetermined thickness;
   (d) forming an electron-beam blocking layer of the gate electrode by depositing a metal capable of anodizing on the base layer to a predetermined thickness; and
   (e) patterning the electron-beam blocking layer in a predetermined pattern by anodizing.

2. The method of claim 1, wherein the substrate is a silicon wafer.

3. The method of claim 2, wherein the insulating layer is made of a silicon oxide layer formed by thermally oxidizing the surface of the silicon wafer.

4. The method of claim 1, before step (b), further comprising step of forming a lower electrode on the substrate.

5. The method of claim 4, wherein, in step (b), the insulating layer is formed by depositing a metal capable of anodizing on the lower electrode and anodizing the metal.

6. The method of claim 1, wherein in step (c), the conductive metal is selected from the group consisting of gold (Au), platinum (Pt), aluminum (Al), titanium (Ti), and tantalum (Ta).

7. The method of claim 1, wherein in step (d), the metal capable of anodizing is selected from the group consisting of titanium (Ti), aluminum (Al), and ruthenium (Ru).

8. The method of claim 1, wherein step (e) comprises steps of:
   anodizing the electron-beam blocking layer in a predetermined pattern by scanning probe microscope (SPM) lithography; and
   removing the anodized portion of the electron-beam blocking layer by etching.

9. The method of claim 1, wherein step (e) comprises steps of:
   coating a resist on the surface of the electron-beam blocking layer;
   patterning the resist in a predetermined pattern;
   anodizing a portion of the electron-beam blocking layer exposed by patterning of the resist; and
   removing the anodized portion of the electron-beam blocking layer by etching and cleaning off the resist.

10. A method of manufacturing an emitter for an electron-beam projection lithography (EPL) system, the method comprising steps of:
    (a) preparing a substrate;
    (b) forming an insulating layer on the substrate;
    (c) depositing a first silicon layer on the insulating layer to a uniform thickness;
    (d) patterning the first silicon layer in a predetermined pattern; and
    (e) depositing a second silicon layer on the insulating layer exposed in step (d) and first silicon layer and forming a gate electrode comprised of the first and second silicon layers.

11. The method of claim 10, wherein the substrate is a silicon wafer.

12. The method of claim 11, wherein the insulating layer is made of a silicon oxide layer formed by thermally oxidizing the surface of the silicon wafer.

13. The method of claim 10, before step (b), further comprising step of forming a lower electrode on the substrate.

14. The method of claim 13, wherein, in step (b), the insulating layer is formed by depositing a metal capable of anodizing on the lower electrode and anodizing the metal.

15. The method of claim 10, wherein step (d) comprises steps of: coating a resist on the surface of the first silicon layer; patterning the resist in a predetermined pattern; and etching the first silicon layer using the resist as an etch mask.

* * * * *